(12) United States Patent
Kitamura

(10) Patent No.: US 6,788,030 B2
(45) Date of Patent: Sep. 7, 2004

(54) VOLTAGE CONTROL CIRCUIT FOR A BICYCLE DYNAMO

(75) Inventor: Satoshi Kitamura, Kitakatsuragi-gun (JP)

(73) Assignee: Shimano, Inc., Sakai (JP)

( * ) Notice: Subject to any disclaimer, the term of this patent is extended or adjusted under 35 U.S.C. 154(b) by 0 days.

(21) Appl. No.: 10/616,253

(22) Filed: Jul. 8, 2003

(65) Prior Publication Data
US 2004/0052017 A1 Mar. 18, 2004

(30) Foreign Application Priority Data
Jul. 10, 2002 (JP) ........................................ 2002-201117

(51) Int. Cl.[7] .............................................. H02P 9/44

(52) U.S. Cl. .......................................... 322/28; 322/29
(58) Field of Search ............................... 322/28–29, 25, 322/87, 7–8

(56) References Cited

U.S. PATENT DOCUMENTS

| 4,882,531 | A | * | 11/1989 | Edwards et al. ............... 322/60 |
| 4,894,602 | A | * | 1/1990 | Davis et al. ................... 322/38 |
| 5,780,995 | A | * | 7/1998 | Maggioni et al. .............. 322/8 |
| 6,133,715 | A | * | 10/2000 | Sada et al. ..................... 322/28 |
| 6,646,400 | B2 | * | 11/2003 | Uno ............................. 318/479 |
| 2002/0185992 | A1 | * | 12/2002 | Kouwa ......................... 322/28 |

* cited by examiner

Primary Examiner—Thanh Lam
(74) Attorney, Agent, or Firm—James A. Deland

(57) ABSTRACT

A device is provided for preventing high voltage from acting on a load driven by a bicycle dynamo. The device comprises a sensor circuit and a control circuit. The sensor circuit senses an operating signal derived from the dynamo, wherein the operating signal corresponds to a voltage generated by the dynamo. The sensor circuit also provides a control signal when the operating signal passes a threshold value. The control circuit is operatively coupled to the sensor circuit and is adapted to be coupled between the dynamo and the load to control the current delivered to the load in response to the control signal.

20 Claims, 8 Drawing Sheets

VOLTAGE CONTROL CIRCUIT FOR A BICYCLE DYNAMO

BACKGROUND OF THE INVENTION

The present invention is directed to bicycles and, more particularly, to an apparatus for controlling a voltage generated by a bicycle dynamo.

Automatic transmission shifting devices are commonly provided in newer bicycles. Such bicycles often employ an electrically powered transmission. Accordingly, a dynamo is usually provided for generating electrical power, and a charging system is provided for charging a battery or other voltage storing device used to supply the electrical power to the electrically powered transmission. The dynamo in such a system typically generates voltage in a manner proportional to the rotational speed of the bicycle wheel. In some instances, the generated voltage may exceed 100 V at high speed. It is thus necessary to design the elements of the charging system and any other elements that are driven by the voltage generated by the dynamo to withstand high voltage. However, elements capable of withstanding high voltage lack versatility and are expensive.

As shown in FIG. 1, the voltage generated by a dynamo typically increases with the resistance of the dynamo load and with an increase in wheel speed. Thus, a high resistance load could be damaged during high speed riding conditions unless the load is constructed to withstand such high voltages. Also, as shown in FIG. 2, a high resistance load increases the torque required to rotate the dynamo at higher speeds, whereas a low resistance load decreases the torque required to rotate the dynamo at higher speeds. The cause of this tendency lies principally with overcurrent loss generated within the dynamo. Thus, not only must high resistance loads be constructed to withstand high voltages, but the rider must exert greater pedaling forces to rotate the dynamo at higher speeds.

SUMMARY OF THE INVENTION

The present invention is directed to various features of a device for controlling the application of power from a dynamo to a load. In one embodiment, a device is provided for preventing high voltage from acting on a load driven by a bicycle dynamo. The device comprises a sensor circuit and a control circuit. The sensor circuit senses an operating signal derived from the dynamo, wherein the operating signal corresponds to a voltage generated by the dynamo. The sensor circuit also provides a control signal when the operating signal passes a threshold value. The control circuit is operatively coupled to the sensor circuit and is adapted to be coupled between the dynamo and the load to control the current delivered to the load in response to the control signal.

Additional inventive features will become apparent from the description below, and such features alone or in combination with the above features may form the basis of further inventions as recited in the claims and their equivalents.

DETAILED DESCRIPTION OF THE EMBODIMENTS

Figure 1:
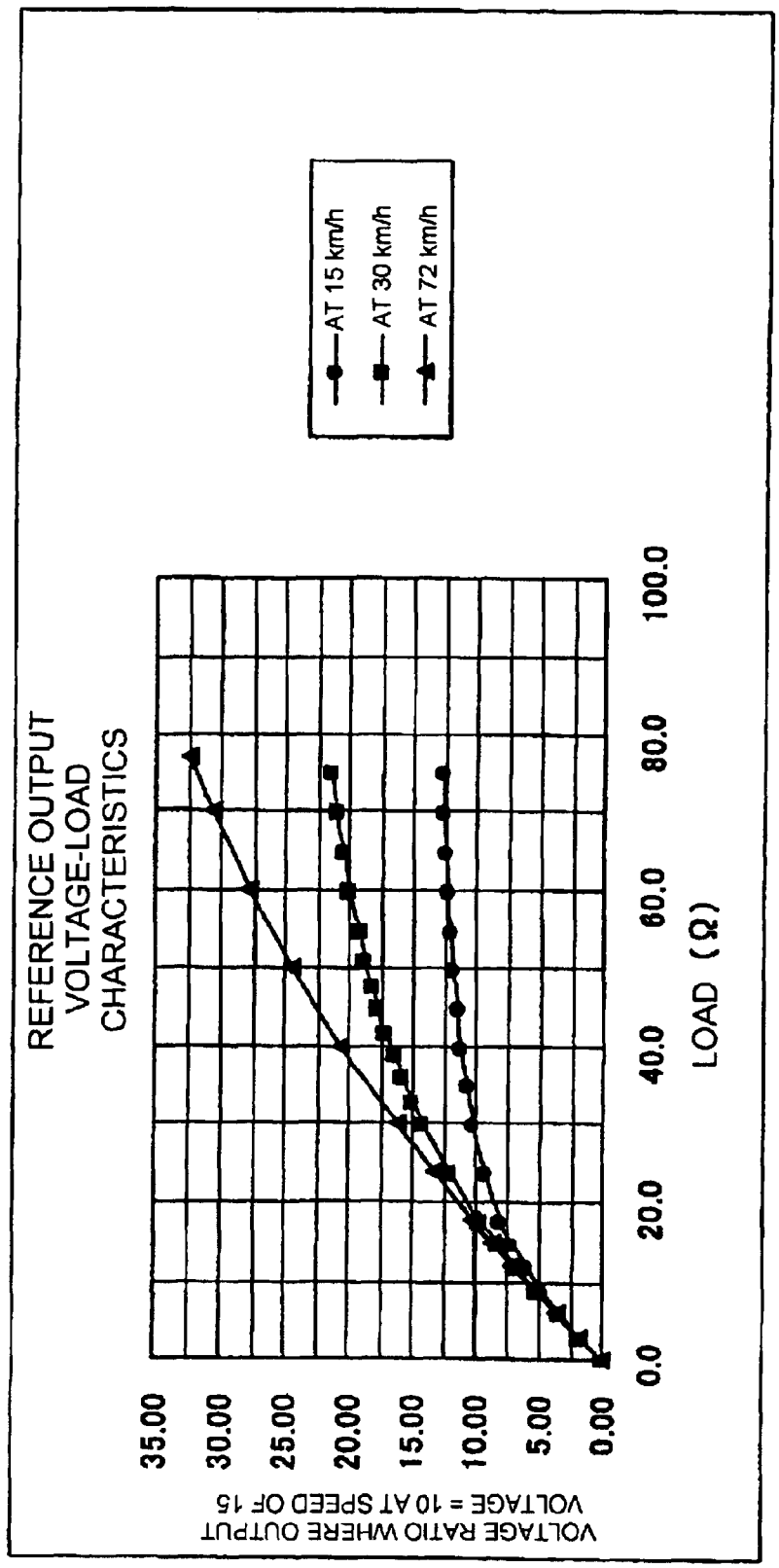
FIG. 1 is a graph showing dynamo output voltage for various load resistances at various speeds.
Figure 2:
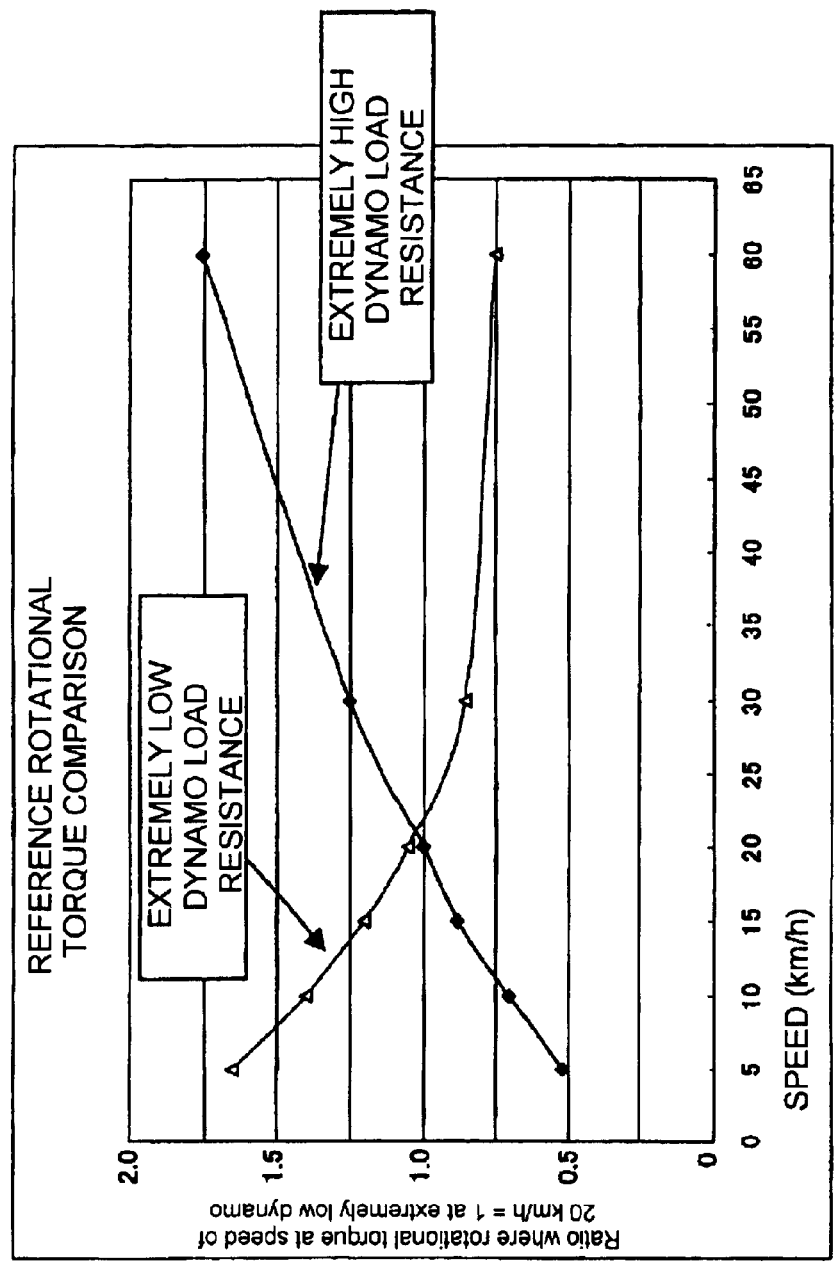
FIG. 2 is a graph showing required rotational torque for a dynamo for different load resistances at various speeds.
Figure 3:
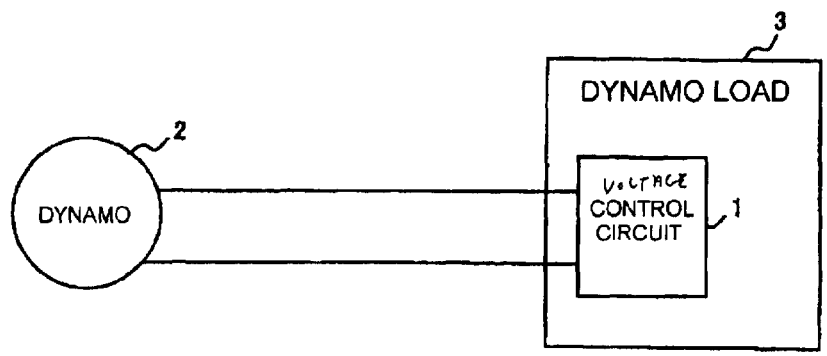
FIG. 3 is a diagram of an embodiment of a voltage control circuit used with a bicycle dynamo and a driven load.
Figure 4:
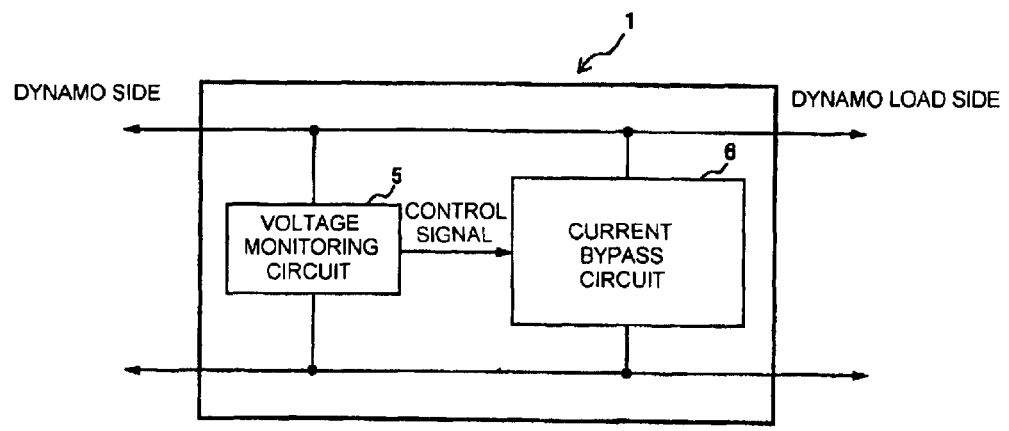
FIG. 4 is a more detailed diagram of a particular embodiment of a voltage control circuit.
Figure 5:
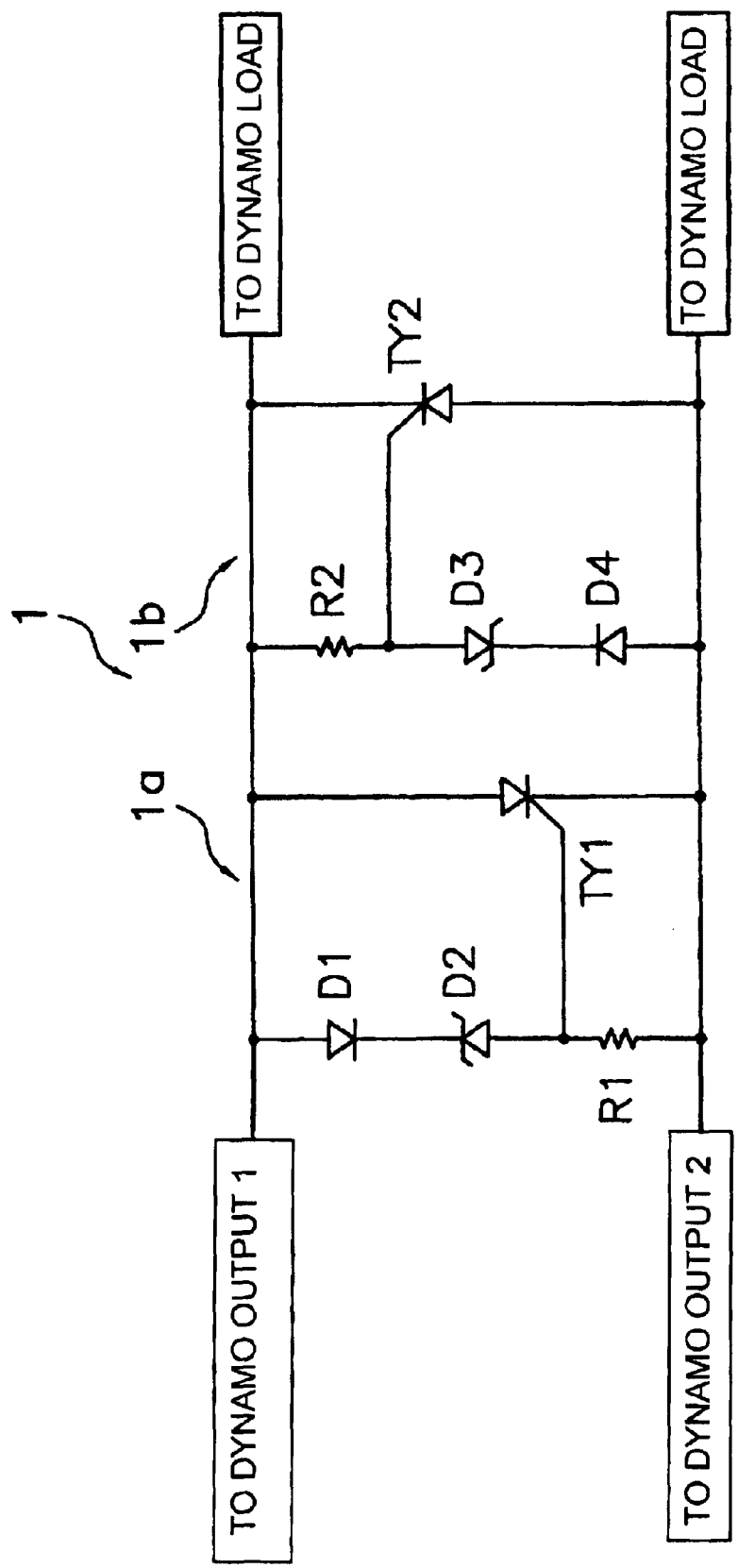
FIG. 5 is a schematic diagram of relevant components of a particular embodiment of a voltage control circuit.

FIG. 3 is a diagram of an embodiment of a voltage control circuit 1 used with a bicycle dynamo 2 and a driven dynamo load 3; FIG. 4 is a more detailed diagram of voltage control circuit 1; and FIG. 5 is a schematic diagram of relevant components of voltage control circuit 1. In this embodiment, voltage control circuit 1 is a device for preventing high voltage from being applied to dynamo load 3, and it is constructed integrally with dynamo load 3. In this embodiment, as shown in FIG. 4, voltage control circuit 1 has a sensor circuit in the form of a voltage monitoring circuit 5 and a control circuit in the form of a current bypass circuit 6. Voltage monitoring circuit 5 senses an operating signal such as a voltage generated by dynamo 2 and outputs a control signal when voltage generated by dynamo 2 exceeds a predetermined threshold value. Current bypass circuit 6 is disposed between dynamo 2 and dynamo load 3 and shunts current across the dynamo output terminals (away from dynamo load 3) in response to the control signal from voltage monitoring circuit 5 to control the current delivered to dynamo load 3.

As shown in FIG. 5, since dynamo 2 outputs an AC waveform, voltage control circuit 1 comprises a positive side circuit 1a and a negative side circuit 1b. Positive side circuit 1a functions during positive (+) half cycles of the dynamo output waveform, and negative side circuit 1b functions during negative (−) half cycles of the dynamo output waveform. Positive side circuit 1a has a Zener diode D2 and a thyristor TY1 disposed between the first output terminal and second output terminal of dynamo 2. Zener diode D2 is connected to block current flow from the first output terminal toward the second output terminal when the signal at the first output terminal of dynamo 2 is positive (+). A diode D1 and resistance R1 are connected in series with Zener diode D2, wherein diode D1 is connected to allow current flow from the first output terminal of dynamo 2 toward the Zener diode D2, and resistance R1 is connected between Zener diode D2 and the second output terminal of dynamo 2. The withstand voltage across the gate terminal of thyristor TY1 is relatively low (within about ±100 V) in the case of many small scale thyristors, so diode D1 and resistance R1 function to protect the gate terminal of thyristor TY1 from large voltages generated by dynamo 2. Thyristor TY1 is connected to allow current flow from the first output terminal to the second output terminal of dynamo 2 when thyristor TY1 is turned on. Some of the current passing through Zener diode D2 is supplied to thyristor TY1 as gate current.

Negative side circuit 1b is similar to positive side circuit 1a but with opposite polarity. More specifically, negative side circuit 1b has a Zener diode D3 and a thyristor TY2 disposed between the first output terminal and second output terminal of dynamo 2. Zener diode D3 is connected to block current flow from the second output terminal toward the first output terminal when the signal at the second output terminal of dynamo 2 is positive (+). A diode D4 and resistance R2 are connected in series with Zener diode D3, wherein diode D4 is connected to allow current flow from the second output terminal of dynamo 2 toward Zener diode D3, and resistance R2 is connected between Zener diode D3 and the first output terminal of dynamo 2. Diode D4 and resistance R2 protect thyristor TY2 in the same manner described above for thyristor TY1. Thyristor TY2 is connected to allow current flow from the second output terminal to the first output terminal of dynamo 2 when thyristor TY2 is turned on. Some of the current passing through Zener diode D3 is supplied to thyristor TY2 as gate current.

Figure 6:
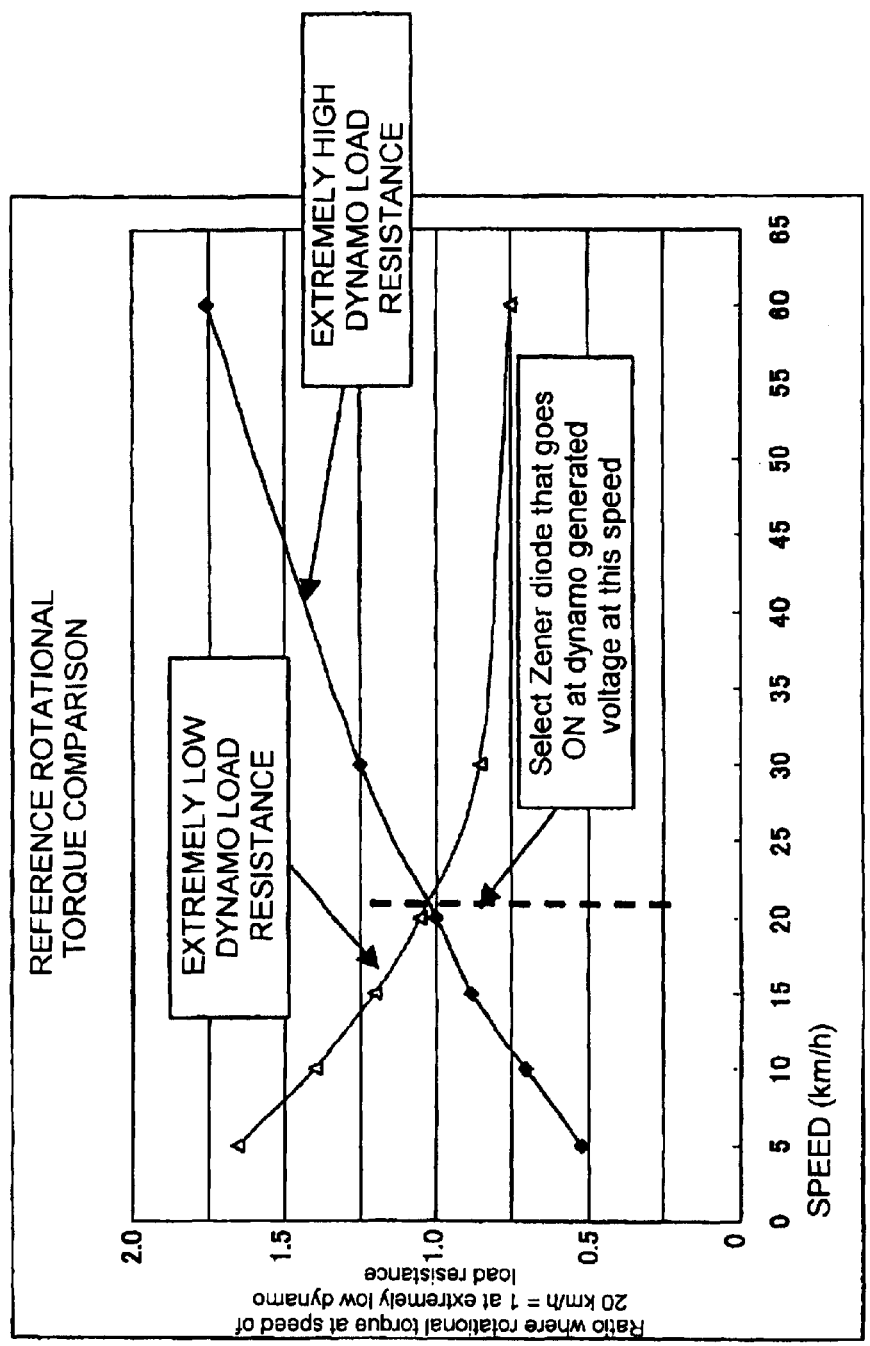
FIG. 6 is a graph showing a threshold value for a particular embodiment of a sensor circuit.

In this embodiment, the Zener diodes D2, D3 are selected such that they will break down (turn on) at the point where the characteristic curve for a low resistance load intersects the characteristic curve for a high resistance load as shown in FIG. 6.

Figure 7:
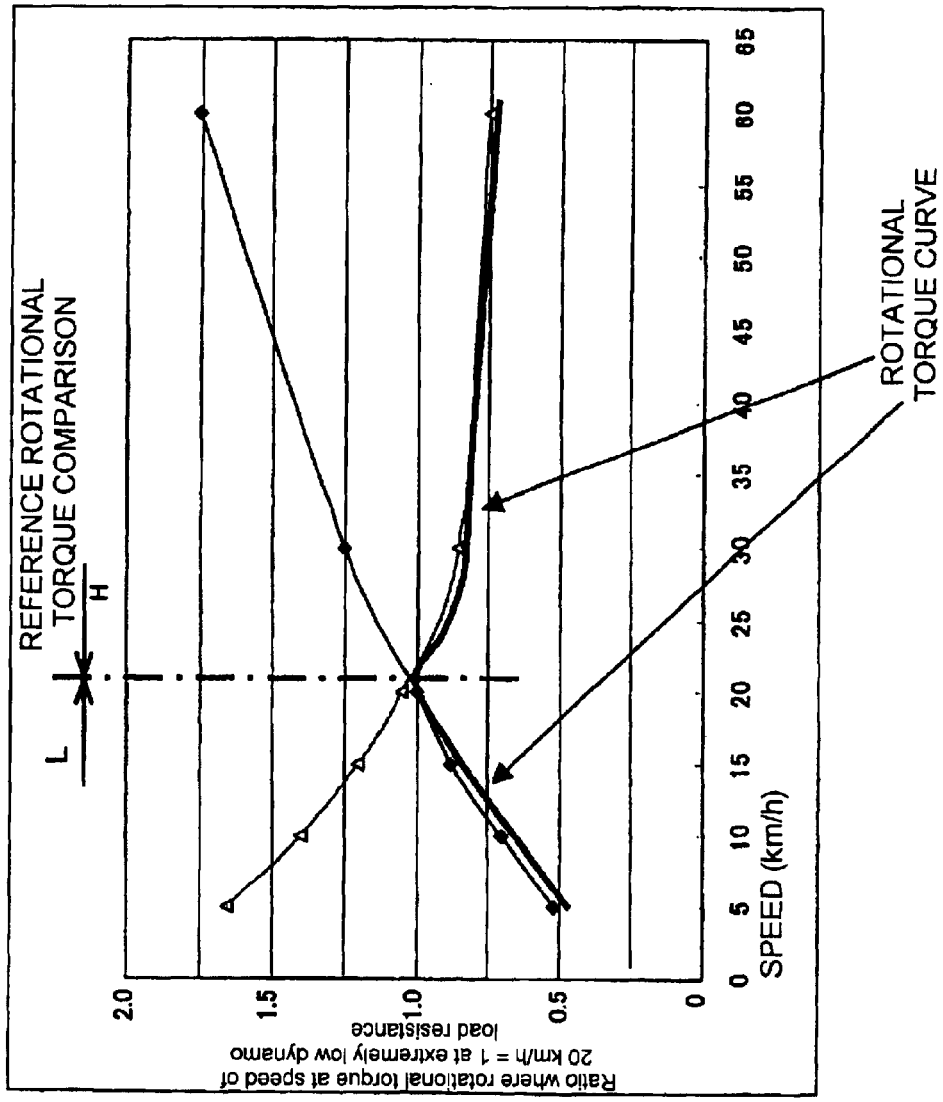
FIG. 7 is a graph of rotational torque characteristics of a dynamo used with a particular embodiment of a voltage control circuit.

When traveling at low speed, the voltage generated by the dynamo 2 is low. Thus, during the positive cycle at the first output terminal of dynamo 2, current is blocked by the Zener diode D2 and diode D4, there is no current flow to the gates of thyristors TY1, TY2, and thyristors TY1, TY2 are in the current blocking (off) state. In the opposite cycle, i.e., during the positive cycle at the second output terminal of dynamo 2, current is blocked by the Zener diode D3 and diode D1, there is no current flow to the gates of thyristors TY1, TY2, and thyristors TY1, TY2 are again in the current blocking (off) state. As a result, during travel at low speed, current from the dynamo 2 is supplied to the dynamo load side without bypass. Since the voltage generated by the dynamo 2 is low, the application of this voltage to elements on the dynamo load side will not result in damage or other problems. Additionally, since current is not bypassed through the bypass circuit 6, the rotational torque characteristics of the dynamo correspond to the characteristic curve for the very low dynamo load resistance shown in FIG. 7.

Assume wheel speed increases to the point where the voltage generated by the dynamo 2 exceeds the breakdown voltage of the Zener diodes D2, D3. During the positive cycle at the first output terminal of dynamo 2, the Zener diode D2 in the positive side circuit 1a turns on so that current flows to the gate of thyristor TY1 and turns on thyristor TY1. As a result, current from dynamo 2 is shunted from the first output terminal to the second output terminal through thyristor TY1. During the positive cycle at the first output terminal of dynamo 2, current is blocked by diode D4 in the negative side circuit 1b so that thyristor TY2 remains off. During the positive cycle at the second output terminal of dynamo 2, Zener diode D3 in the negative side circuit 1b turns on so that current flows to the gate of thyristor TY2 and turns on thyristor TY2. As a result, current from dynamo 2 is shunted from the second output terminal to the first output terminal through thyristor TY2. During the positive cycle at the second output terminal, current is blocked by diode D1 so that thyristor TY1 remains off. As a result, during travel at high speed, current from the dynamo 2 is shunted through the current bypass circuit 6 and is not delivered to the dynamo load side. The application of high voltage to the elements on the dynamo load side is avoided, thereby preventing damage to elements. Thus, it is not necessary to employ elements with high withstand voltage on the dynamo load side. Also, since current is bypassed through the bypass circuit 6, the rotational torque characteristics of the dynamo 2 after current bypass correspond to the characteristic curve for the very low dynamo load resistance shown in FIG. 7, thus resulting in less required pedaling effort by the rider.

Figure 8:
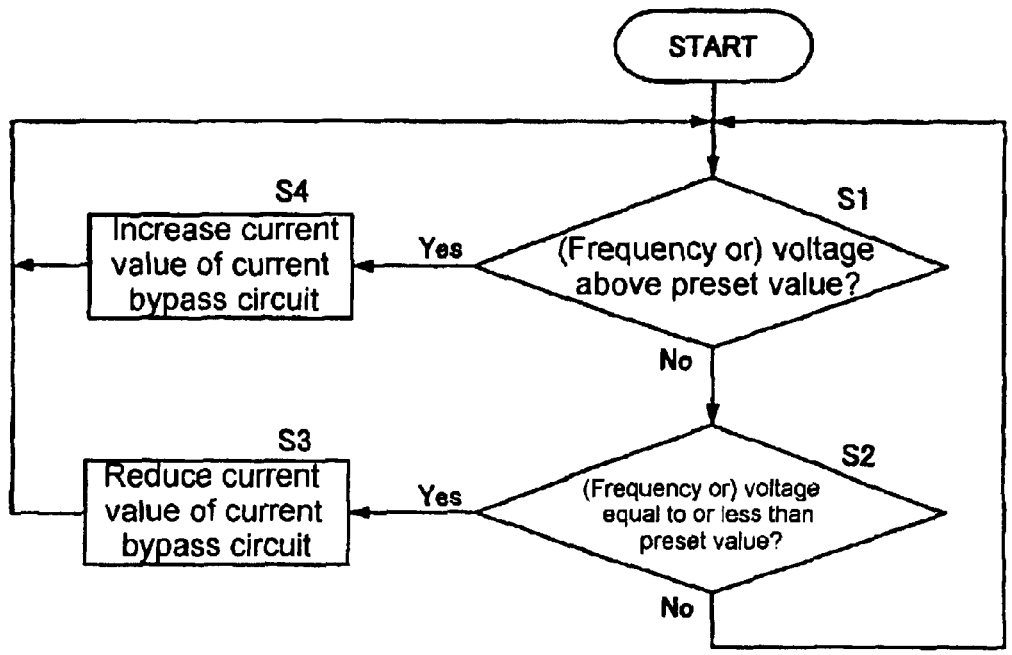
FIG. 8 is a flow chart of a particular embodiment of a voltage control process.

FIG. 8 is a flow chart of a particular embodiment of a voltage control process for the above circuit. In Step S1, it is determined whether the voltage generated by the dynamo 2 exceeds a set value, and in Step S2 it is determined whether the voltage generated is equal to or less than the set value. These decision steps S1, S2 correspond to determining whether the generated voltage exceeds the breakdown voltage of the Zener diodes D2, D3. In the event that the generated voltage is equal to or below the set value, the system proceeds to Step S3, and the amount of current passing through the current bypass circuit 6 is reduced. The process of Step S3 corresponds to the case where Zener diodes D2, D3 are in current blocking mode and thyristors TY1, TY2 are turned off. On the other hand, if wheel speed is high so that the generated voltage exceeds the set value, the system proceeds to Step S4, and the amount of current passing through the current bypass circuit is increased. The process of Step S4 corresponds to the case where Zener diodes D2, D3 are turned on, thyristors TY1, TY2 are turned on, and current is shunted away from the dynamo load 3.

Figure 9:
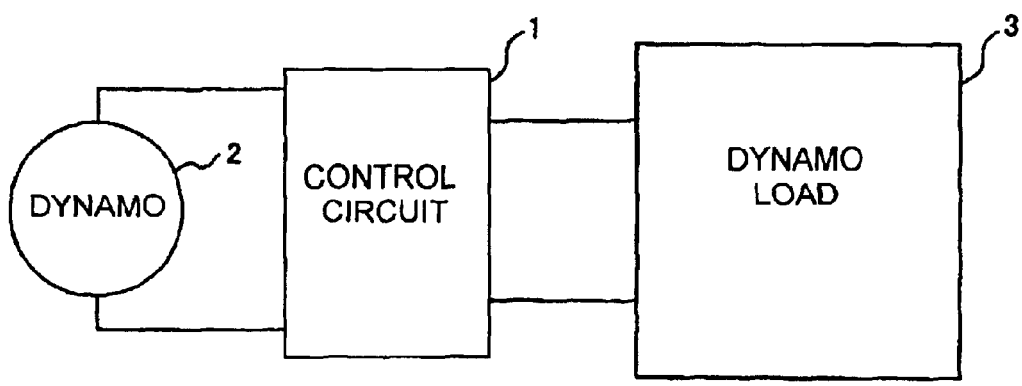
FIG. 9 is a diagram of another embodiment of a voltage control circuit used with a bicycle dynamo and a driven load.
Figure 10:
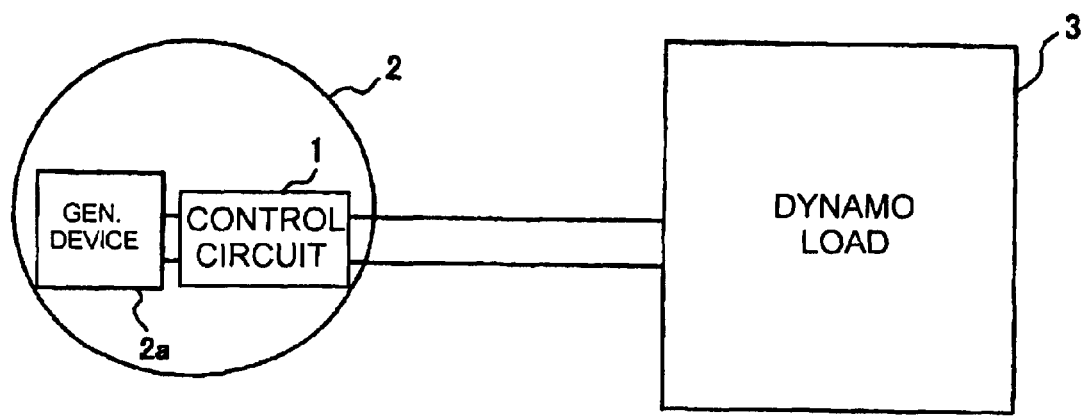
FIG. 10 is a diagram of another embodiment of a voltage control circuit used with a bicycle dynamo and a driven load.

While the above is a description of various embodiments of inventive features, further modifications may be employed without departing from the spirit and scope of the present invention. For example, a voltage control circuit comprising a voltage monitoring circuit and a current bypass circuit need not be constructed integrally with the dynamo load 3. As shown in FIG. 9, those components could be situated on separate connection lines between dynamo 2 and dynamo load 3. This allows a conventional system not equipped with a voltage control circuit to be retrofitted so that elements on the dynamo load side can be protected and rotational torque during high speed travel can be reduced. The voltage control circuit 1 also could be connected to a generating device 2a within dynamo 2 as shown in FIG. 10. This reduces the amount of space occupied by the device in the overall system.

In the embodiment described hereinabove, the voltage is directly sensed by Zener diodes, but since generated voltage is proportional to the frequency of dynamo output, a frequency derived from the dynamo output could be sensed instead to determine whether generated voltage exceeds the predetermined threshold voltage.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A device for preventing high voltage from acting on a load driven by a bicycle dynamo, wherein the device comprises:

a sensor circuit that senses an operating signal derived from the dynamo, wherein the operating signal corresponds to a voltage generated by the dynamo;

wherein the sensor circuit provides a control signal when the operating signal passes a threshold value; and a control circuit operatively coupled to the sensor circuit and adapted to be coupled between the dynamo and the load to control the current delivered to the load in response to the control signal.

2. The device according to claim 1 wherein the control circuit shunts current away from the load in response to the control signal.

3. The device according to claim 1 wherein the sensor circuit is structured to sense a voltage generated by the dynamo.

4. The device according to claim 1 wherein the sensor circuit is structured to sense a frequency generated by the dynamo.

5. The device according to claim 1 wherein the sensor circuit includes a Zener diode that receives the operating signal derived from the dynamo.

6. The device according to claim 5 wherein the Zener diode is adapted to be coupled between first and second output terminals of the dynamo.

7. The device according to claim 5 wherein the Zener diode provides the control signal.

8. The device according to claim 7 wherein the control circuit includes a thyristor that receives the control signal from the Zener diode.

9. The device according to claim 8 wherein the control signal is applied to a gate terminal of the thyristor.

10. The device according to claim 9 wherein the thyristor is adapted to be coupled between first and second output terminals of the dynamo.

11. The device according to claim 10 wherein the Zener diode is adapted to be coupled between the first and second output terminals of the dynamo.

12. The device according to claim 1 wherein the control circuit includes a thyristor that receives the control signal from the sensor circuit.

13. The device according to claim 12 wherein the control signal is applied to a gate terminal of the thyristor.

14. The device according to claim 12 wherein the thyristor is adapted to be coupled between first and second output terminals of the dynamo.

15. The device according to claim 1 wherein the sensor circuit and the control circuit are integrally constructed with the load.

16. The device according to claim 1 wherein the sensor circuit and the control circuit together are adapted to be coupled between the dynamo and the load.

17. The device according to claim 1 wherein the sensor circuit and the control circuit are integrally constructed with the dynamo.

18. The device according to claim 1 wherein the sensor circuit comprises:

a positive side sensor circuit that senses a first operating signal derived from a positive cycle of the dynamo; and a negative side sensor circuit that senses a second operating signal derived from a negative cycle of the dynamo; and wherein the control circuit comprises:

a positive side control circuit that controls the current delivered to the load during the positive cycle of the dynamo; and a negative side control circuit that controls the current delivered to the load during the negative cycle of the dynamo.

19. The device according to claim 18 wherein the positive side sensor circuit comprises a first Zener diode that provides a positive cycle control signal, wherein the negative side sensor circuit comprises a second Zener diode that provides a negative cycle control signal, wherein the positive side control circuit comprises a first thyristor that receives the positive cycle control signal, and wherein the negative side control circuit comprises a second thyristor that receives the negative cycle control signal.

20. The device according to claim 19 wherein the first Zener diode provides the positive cycle control signal to a gate terminal of the first thyristor, and wherein the second Zener diode provides the negative cycle control signal to a gate terminal of the second thyristor.

* * * * *